(12) United States Patent
Gibson

(10) Patent No.: US 6,619,439 B2
(45) Date of Patent: Sep. 16, 2003

(54) MECHANICAL RELEASE FOR PARKING BRAKE CABLE SYSTEM

(75) Inventor: Jeffrey Glenn Gibson, Paw Paw, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 3 days.

(21) Appl. No.: 09/950,108

(22) Filed: Sep. 10, 2001

(65) Prior Publication Data

US 2003/0047393 A1 Mar. 13, 2003

(51) Int. Cl.[7] .............................................. F16D 65/36
(52) U.S. Cl. ...................... 188/2 D; 188/158; 74/502.4; 74/502.6
(58) Field of Search ................. 188/2 D, 216, 188/156, 158, 151 A, 265, 162, 67; 303/20; 74/529, 536, 537, 538, 625, 500.5–502.6, 501.5 R, 593, 516, 518; 474/80

(56) References Cited

U.S. PATENT DOCUMENTS

| | | | | |
|---|---|---|---|---|
| 2,335,000 A | * | 11/1943 | Edwards | |
| 3,780,599 A | * | 12/1973 | Schaefer | |
| 3,878,920 A | * | 4/1975 | Fugii | 188/2 D |
| 5,060,534 A | * | 10/1991 | Yoshigai | 74/502.2 |
| 5,135,246 A | * | 8/1992 | Montague | |
| 5,590,744 A | | 1/1997 | Belmond | 188/265 |
| 6,213,259 B1 | | 4/2001 | Hanson et al. | 188/156 |
| 6,244,394 B1 | | 6/2001 | Gutierrez et al. | 188/72.8 |
| 6,279,688 B1 | * | 8/2001 | Goldman et al. | |
| 6,386,338 B1 | * | 5/2002 | Powrozek | 188/156 |
| 6,478,118 B2 | * | 11/2002 | Astrom et al. | 303/20 |
| 2002/0066626 A1 | * | 6/2002 | Gill et al. | 188/158 |

FOREIGN PATENT DOCUMENTS

| | | | |
|---|---|---|---|
| JP | 346111 | * | 12/2000 |
| WO | 9841431 | * | 9/1998 |
| WO | 0020266 | * | 4/2000 |
| WO | 0020268 | * | 4/2000 |

* cited by examiner

Primary Examiner—Douglas C. Butler
(74) Attorney, Agent, or Firm—Peter D. McDermott; Casimir R. Kiczek

(57) ABSTRACT

A mechanical release for an electric parking brake has a first cable engaging a housing. A second cable is connected to a lever that is pivotally supported on the housing by a pivot pin. A locking member engages the lever and prevents rotation of the lever when tension is applied to the cables. When the locking member is released, the lever is free to rotate, reducing tension in the cables and freeing the parking brake system.

20 Claims, 5 Drawing Sheets

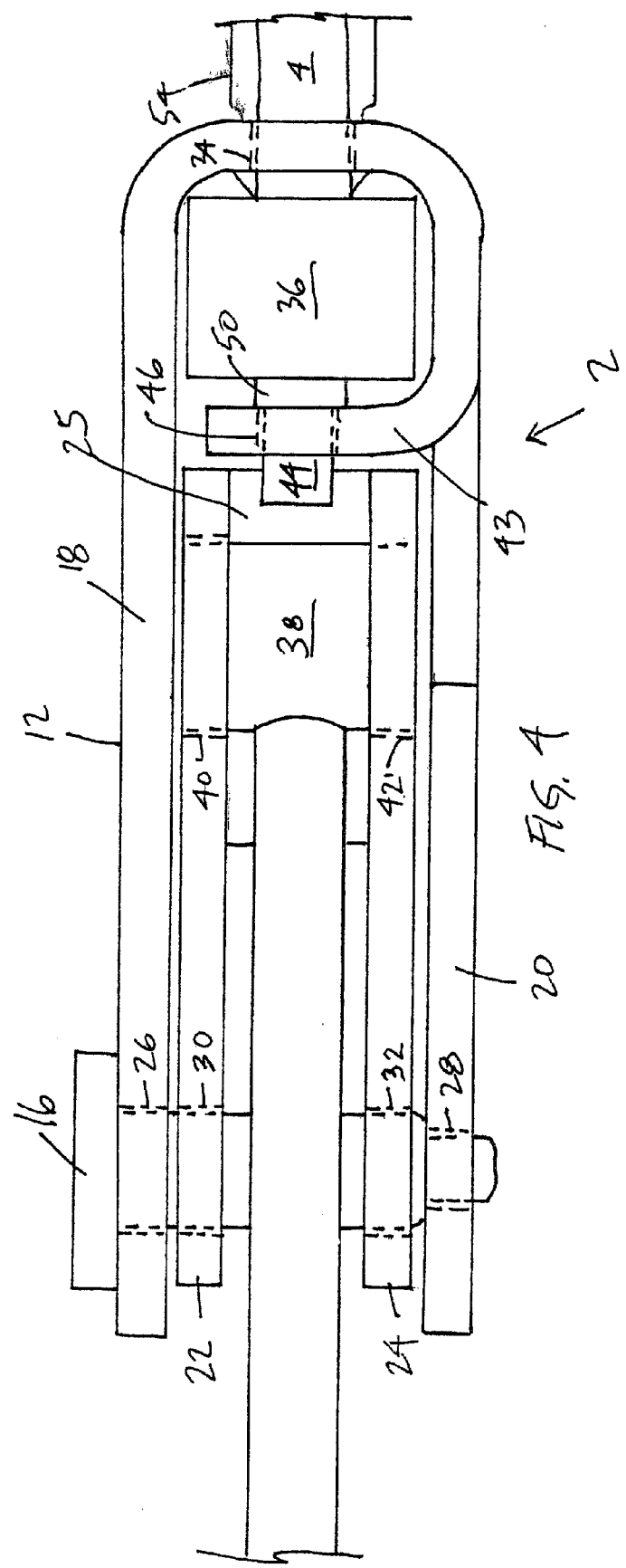

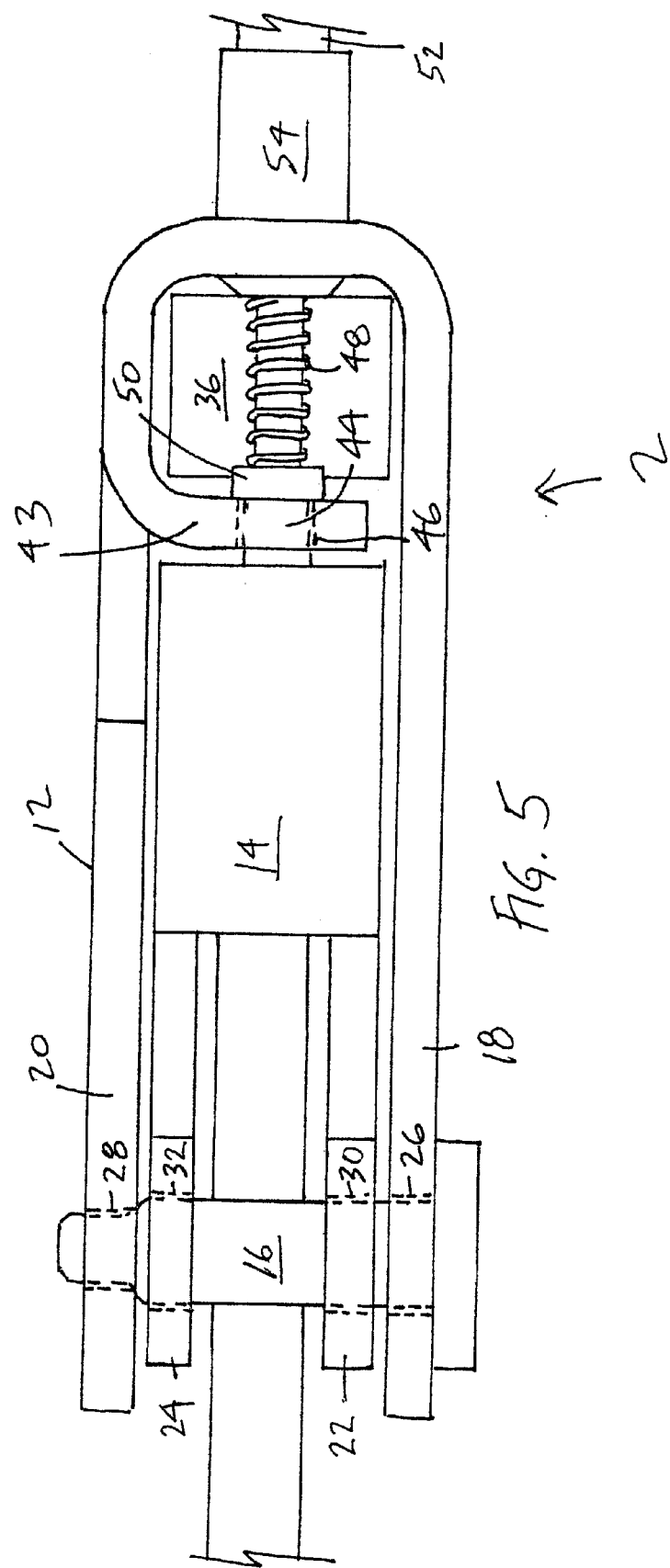

MECHANICAL RELEASE FOR PARKING BRAKE CABLE SYSTEM

FIELD OF THE INVENTION

This invention relates generally to the field of parking brake cable systems, and in particular, to electric park brake cable systems having a mechanical release.

BACKGROUND OF THE INVENTION

Electric, or electro-mechanically actuated, devices are known in the art for providing a parking brake function for motor vehicles. Such systems typically use a motor and associated gear assembly that are connected to a cable, which is in turn connected to the vehicle's braking system. Upon actuation of the motor, tension is applied to the cable, engaging the vehicle's brakes. A problem with such systems occurs when the electric parking brake cannot be disengaged, e.g., due to loss of electrical power, preventing release of the parking brake.

U.S. Pat. No. 6,244,394 to Gutierrez et al. discloses an electric parking brake system having a motor driven telescopic device for application of the parking brake. A release device including a pawl and mating socket in a stud is integrated in the telescopic device, and serves to release the parking brake in the event that the electric parking brake cannot be disengaged.

It is an object of the present invention to provide a mechanical release for an electric parking brake system that reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of preferred embodiments.

BRIEF SUMMARY OF THE INVENTION

The principles of the invention may be used to advantage to provide a simple and efficient mechanical release for an electric parking brake.

In accordance with a first embodiment, a mechanical release for an electric parking brake system includes a housing. One end of a first brake cable engages the housing. A lever is pivotally connected at a first end thereof to the housing. A second brake cable is pivotally connected at one end thereof to a second end of the lever. A locking member engages the lever to releasably secure the lever to the housing.

In accordance with a second embodiment, a device for releasing an electric parking brake system includes a housing member adapted to be connected to a first brake cable. A lever is pivotally connected at a first end to the housing member and is adapted to be connected at a second end to a second brake cable. A locking member engages the lever to releasably secure the lever to the housing member.

In accordance with yet another embodiment, a mechanical release for an electric parking brake system includes a housing having a first wall and an opposed second wall. A first brake cable has a fitting at one end thereof, and the fitting engages the housing. A lever has a first arm and a second arm, and the lever is positioned between the first and second walls of the housing. A pivot pin extends through the first arm and the second arm of the lever, and through the first and second walls of the housing. A second brake cable has a fitting at one end thereof that is pivotally connected to the lever. A locking pin engages the lever to releasably secure the lever to the housing. A coil spring biases the locking pin into engagement with the lever, and a pull cable is secured to the locking pin.

From the foregoing disclosure, it will be readily apparent to those skilled in the art, that is, those who are knowledgeable or experienced in this area of technology, that the present invention provides a significant advance. Preferred embodiments of the mechanical release mechanism of the present invention can provide an efficient and cost-effective manner of providing for the release of an electric parking brake system in the event the electric braking system cannot be disengaged. These and additional features and advantages of the invention disclosed here will be further understood from the following detailed disclosure of preferred embodiments.

BRIEF DESCRIPTION OF THE DRAWINGS

FIG. 4 is a top plan view of the mechanical release of FIG. 1.

FIG. 5 is a bottom plan view of the mechanical release of FIG. 1.

DETAILED DESCRIPTION OF THE INVENTION

Figure 1:
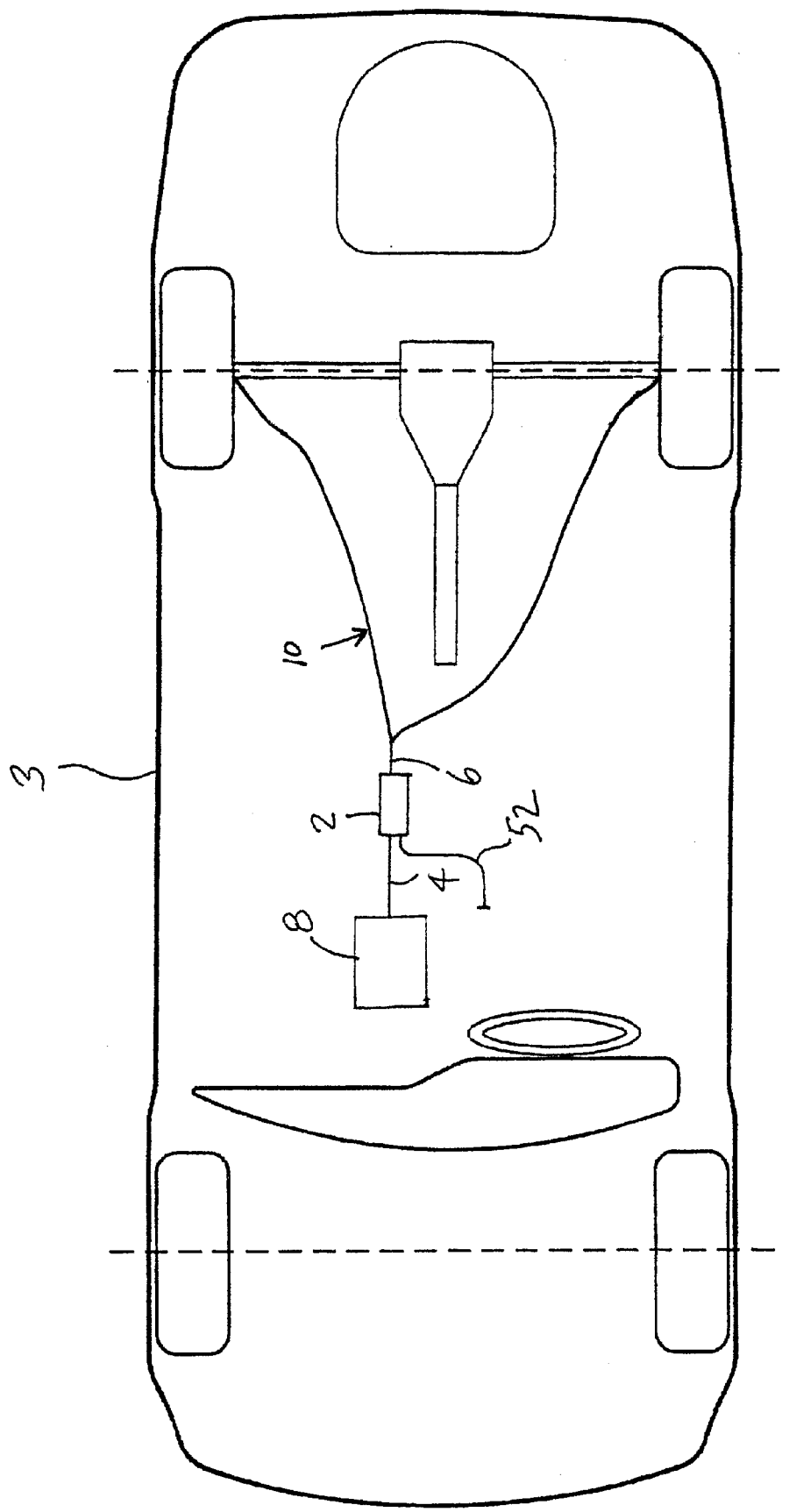
FIG. 1 is a diagrammatic plan view of a mechanical release for an electric parking brake in accordance with the present invention, shown installed with an electric parking brake system of a vehicle.
Figure 2:
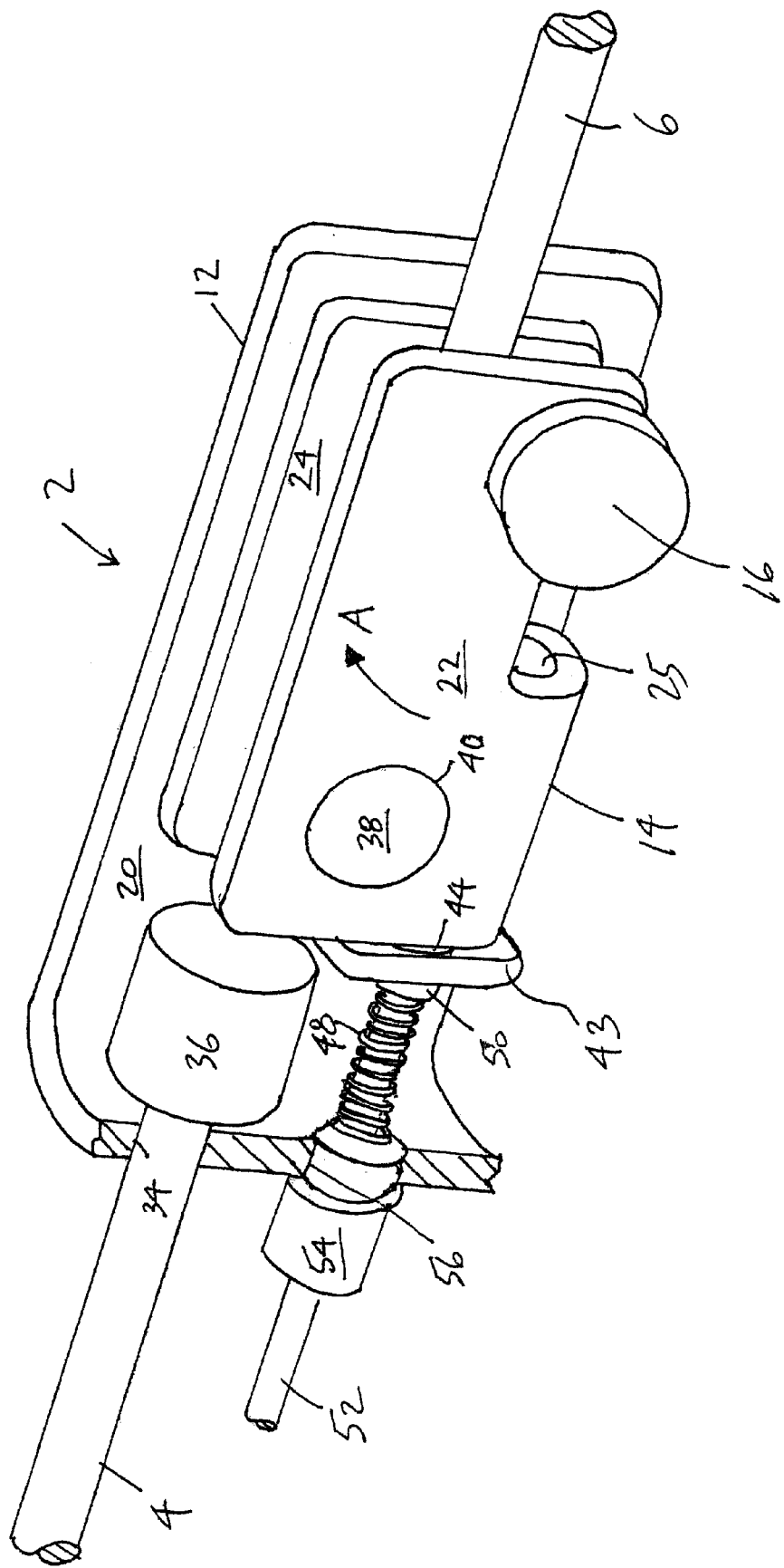
FIG. 2 is a perspective view of a first side of the mechanical release of FIG. 1, shown with a portion of a housing of the mechanical release partially broken away.
Figure 3:
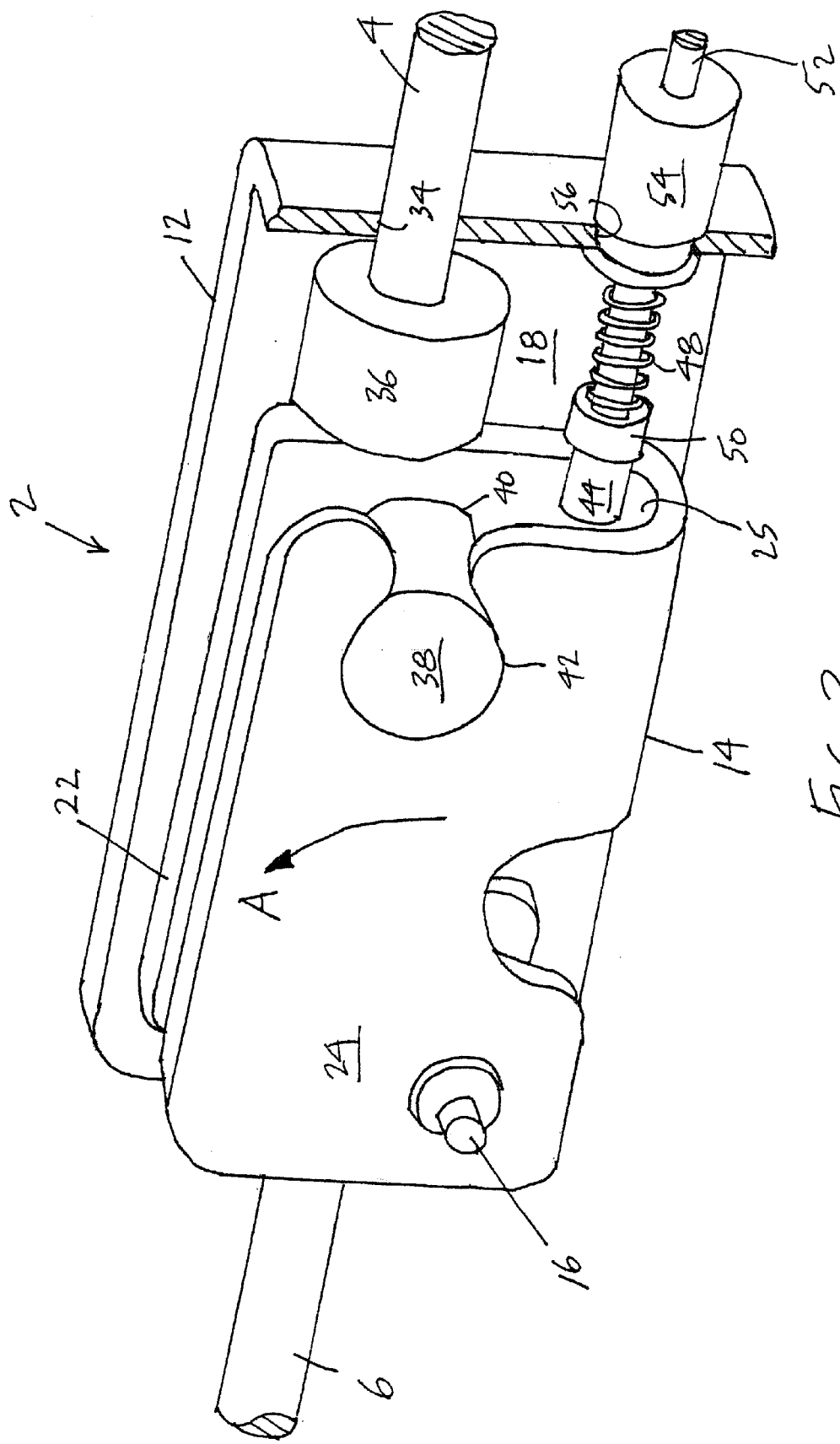
FIG. 3 is a perspective view of an opposite side of the mechanical release of FIG. 1, shown with a portion of a housing of the mechanical release partially broken away.

FIG. 1 illustrates a mechanical release device 2 for incorporation in an electric parking brake system of a vehicle 3 in accordance with a preferred embodiment of the present invention. Release device 2 is connected at one end to a first cable 4 and at its other end to a second cable 6. In certain preferred embodiments, first cable 4 is a front parking brake cable and second cable 6 is a rear parking brake cable of the vehicle, with release device 2 replacing a typical cable connector used to link the front and rear parking brake cables. First cable 4 is connected to an electric parking brake 8, and second cable 6 is connected to a braking system 10 of a vehicle. When electric parking brake 8 of the vehicle is actuated, tension is created in first and second cables 4, 6, thereby engaging braking system 10 in known fashion. As shown here, braking system 10 has two cables, connecting second cable 6 to both rear wheels of vehicle 3. It is to be appreciated that in other preferred embodiments, second cable 6 could be connected to a single wheel and its associated braking device. Electric parking brakes, e.g., motor and gear assemblies for application of a parking brake, are well known to those skilled in the art, and further discussion of electric parking brake 8 need not be provided here.

As seen in the embodiment illustrated in FIGS. 2–5, release device 2 includes a housing 12. A lever 14 is pivotally connected at a first end thereof to housing 12 via a pivot pin 16. In a preferred embodiment, housing 12 is formed of a plate folded into a substantially U-shaped member having a first wall 18 and an opposed second wall 20, with first and second walls 18, 20 spaced apart and extending in substantially parallel planes. In a preferred embodiment, lever 14 is formed of a substantially U-shaped plate having a first arm 22 and a second arm 24. The plate of lever 14 is folded upon itself to form a channel 25, with first and second arms 22, 24 spaced apart and extending in substantially parallel planes. In certain preferred embodiments, housing 12 and lever 14 are formed of metal, such as steel or aluminum. It is to be appreciated, however, that housing 12 and lever 14 may be formed of alternative materials, e.g., plastic or any other material of sufficient strength to withstand the operational stresses placed on such a release device for a parking brake system.

Lever 14 is pivotally supported on pivot pin 16 between first wall 18 and second wall 20 of housing 12. Pin 16 extends through apertures 26 and 28 formed in first wall 18 and second wall 20, respectively, and through apertures 30 and 32 formed in first arm 22 and second arm 24, respectively. First cable 4 extends through an aperture 34 formed in the base of U-shaped housing 12, and terminates in an end fitting 36. Second cable 6 terminates in an end fitting 38 that is pivotally secured to a second end of lever 14. End fitting 38 is captured by aperture 40 in first arm 22 and recess 42 formed in second arm 24. In a preferred embodiment, first and second cables 4, 6 are coaxial, and their axis is offset laterally (vertically as seen in the embodiment shown in FIGS. 2 and 3) from pivot pin 16. It is to be appreciated that first and second cables 4, 6, in certain preferred embodiments, may be offset from one another laterally.

A portion of second wall 20 is bent inwardly toward a center of housing 12, forming a bracket 43. A locking pin 44 extends through an aperture 46 formed in bracket 43, and is retained in channel 25, between first arm 22 and second arm 24 of lever 14. As tension is applied to first and second cables 4, 6, lever 14 naturally tends to pivot about pin 16, since first and second cables 4, 6 are offset laterally from pin 16. Lever 14 is prevented from pivoting by engagement with locking pin 44.

When electric parking brake 8 is engaged, tension is created in first cable 4. End fitting 36 is retained by housing 12, and end fitting 38 is retained within aperture 40 and recess 42, thereby causing release device 2 to act as a rigid member in tension during normal parking brake operation. Thus, the tension is transmitted from first cable 4 to second cable 6 through release device 2, and then on to the parking brake system of vehicle 3 in known fashion.

In the case where electric parking brake system 8 cannot be disengaged, e.g., when there is a loss of electrical power, release device 2 can be used to release the tension created in first and second cables 4, 6, thereby releasing the parking brake. To release the tension, locking pin 44 is pulled outwardly from channel 25 out of engagement with lever 14, allowing lever 14 to rotate and increasing the effective length of cables 4 and 6. The increased effective length of the cables releases the load placed on the parking brake system. When lever 14 is rotated 180° from its operating position, the greatest effective length, and therefore, the minimum amount of tension is realized in cables 4, 6.

In certain preferred embodiments, a flange 50 is formed on locking pin 44, and a biasing member, such as a coil spring 48, forces flange 50 into engagement with bracket 43, maintaining locking pin 44 in its normal engaged position within channel 25. By pulling on locking pin 44 against the force of spring 48, the engagement of locking pin 44 with lever 14 can be released, allowing lever 14 to pivot freely about pin 16.

In certain preferred embodiments, an end of a release cable 52 is attached to locking pin 44. A flange member 54 on release cable 52 is seated in and supported by an aperture 56 formed in housing 12. Pulling on release cable 52 pulls locking pin 44 against the biasing action of spring 48 out of channel 25 and out of engagement with lever 14, allowing lever 14 to pivot about pin 16 as described above. Thus, release cable 52 allows disengagement of locking pin 44 and release of the electric parking brake at a remote location, such as in the passenger compartment of the vehicle.

It should be understood that the preferred embodiments disclosed herein are by way of example only and merely illustrative of but a small number of the many possible specific embodiments that can represent applications of the principles of the present disclosure. In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

I claim:

1. A mechanical release for an electric parking brake system comprising, in combination:
   a housing;
   a first brake cable, one end of the first brake cable engaging the housing;
   a lever pivotally connected at a first end thereof to the housing;
   a second brake cable pivotally connected at one end thereof to a second end of the lever; and
   a locking member engaging the lever to releasably secure the lever to the housing.

2. The mechanical release of claim 1, further comprising a biasing member biasing the locking member into engagement with the lever.

3. The mechanical release of claim 2, wherein the biasing member comprises a coil spring.

4. The mechanical release of claim 3, wherein the coil spring is positioned between the housing and a flange formed on the locking member.

5. The mechanical release of claim 1, wherein the locking member comprises a locking pin.

6. The mechanical release of claim 5, wherein the lever is formed of a plate folded about itself to form a channel, the channel receiving the locking pin.

7. The mechanical release of claim 5, further comprising a bracket to support the locking pin.

8. The mechanical release of claim 7, further comprising an aperture formed in the bracket, the locking pin extending through the aperture.

9. The mechanical release of claim 1, further comprising a pull cable secured to the locking member.

10. The mechanical release of claim 1, further comprising a pivot pin pivotally connecting the lever to the housing.

11. The mechanical release of claim 10, wherein the first and second cables are coaxial, the axis of the first and second cables being laterally offset from the pivot pin.

12. The mechanical release of claim 1, wherein the housing includes a first wall and an opposed second wall, the lever being positioned between the first and second walls.

13. The mechanical release of claim 1, wherein a portion of the second wall is bent inwardly toward a center of the housing, the inwardly bent portion having an aperture that slidably receives the locking member.

14. The mechanical release of claim 1, further comprising a fitting at the one end of the first brake cable, the fitting engaging the housing.

15. The mechanical release of claim 1, further comprising a fitting at the one end of the second brake cable, the fitting pivotally secured to the lever.

16. A device for releasing an electric parking brake system comprising, in combination:
- a housing member adapted to be connected to a first brake cable;
- a lever pivotally connected at a first end to the housing member and adapted to be connected at a second end to a second brake cable; and
- a locking member engaging the lever to releasably secure the lever to the housing member.

17. The device of claim 16, further comprising a spring biasing the locking member into engagement with the lever.

18. The device of claim 16, wherein the locking member is a locking pin.

19. The device of claim 16, further comprising a pull cable secured to the locking member.

20. A mechanical release for an electric parking brake system comprising, in combination:
- a housing having a first wall and an opposed second wall;
- a first brake cable having a fitting at one end thereof, the fitting engaging the housing;
- a lever having a first arm and a second arm, the lever positioned between the first and second walls of the housing;
- a pivot pin extending through the first arm and the second arm of the lever, and through the first and second walls of the housing;
- a second brake cable having a fitting at one end thereof, the fitting pivotally connected to the lever;
- a locking pin engaging the lever to releasably secure the lever to the housing;
- a coil spring biasing the locking pin into engagement with the lever; and
- a pull cable secured to the locking pin.

* * * * *